May 3, 1932.  W. K. HODGMAN, JR  1,856,333
DRY PIPE VALVE
Filed March 13, 1931

Inventor:
Willis K. Hodgman Jr.
by Heard Smith & Tennant
Attys.

Patented May 3, 1932

1,856,333

UNITED STATES PATENT OFFICE

WILLIS K. HODGMAN, JR., OF TAUNTON, MASSACHUSETTS

DRY PIPE VALVE

Application filed March 13, 1931. Serial No. 522,372.

This invention relates to dry pipe valves and has for its object to provide means for preventing the water valve from closing after it has opened under certain conditions and thus a column of water building up thereon to prevent its opening as required to supply water to the sprinkler system.

The invention is particularly useful in a dry pipe valve operated in connection with an accelerator. The air pressure above the air valve in the dry pipe valve is always intended to be less than the pressure of the water below the water valve and the water valve is held closed because the air valve is of much larger area than the water valve. It occasionally happens, however, that, for various reasons, the pressure of the air above the air valve is somewhat greater than the pressure of the water below the water valve. Consequently when a sprinkler head opens and an accelerator acts to equalize the air pressure on both sides of the air valve, the pressure on the upper side of the water valve will actually be somewhat greater than the pressure on the lower side. As then the pressure on the upper side of the water valve and both sides of the air valve is reduced on account of the air flowing out of one or more sprinkler heads that have opened, the water valve, and with it the air valve, will open slightly, allowing a body of water to pass, the pressure will then be equalized and both valves will then close. When this happens, a column of water will build up first on the water valve and then on the air valve and seriously delay and frequently finally prevent the water valve from opening the passageway through the dry pipe valve.

The present invention provides means specifically in the form of a latch which acts to prevent the water valve from closing after it is once opened under such conditions.

These and other objects and features of the invention will appear more fully from the accompanying description and drawings and will be particularly pointed out in the claims.

The drawings illustrate a dry pipe valve of the general type shown in my prior Patent No. 1,767,129, granted June 24, 1930, as adapted for use with an accelerator and embodying a simple and preferred form of the present invention.

Figure 1:
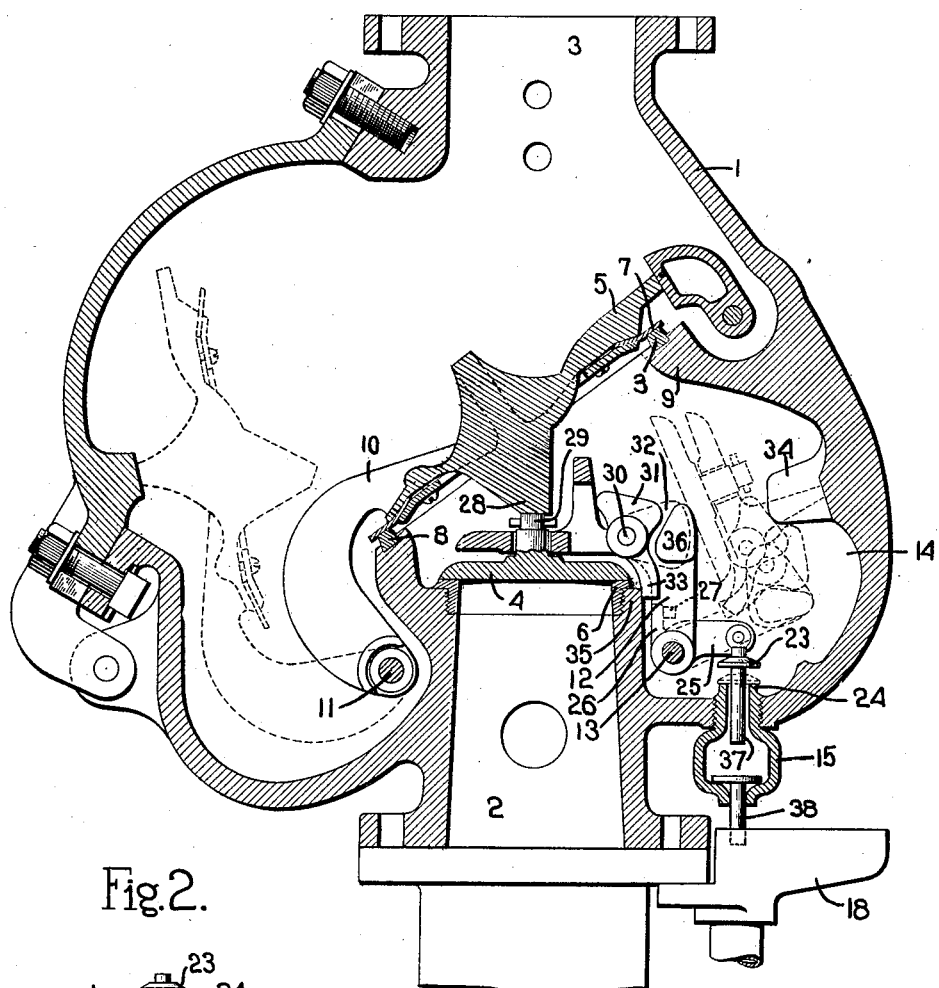
Fig. 1 is a sectional view through the dry pipe valve.

The valve herein shown comprises a casing 1 having an inlet 2 and an outlet 3, the said inlet and outlet being connected by a waterway as usual in dry pipe valves. This waterway is adapted to be closed both by a water valve 4 and an air valve 5, the water valve being adapted to seat on a valve seat 6 at the end of the inlet 2 and the air valve having the usual flexible peripheral flange 7 adapted to seat on the air valve seat 8, which is shown as set obliquely across the waterway and formed on an internal annular flange 9 of the casing.

The air valve 5 is shown as carried by an arm 10 pivotally mounted in the casing at 11 so that the air valve may swing from closed to open position, as shown by the full and dotted lines, respectively, in the drawings.

The water valve 4 is carried by another arm 12 pivotally mounted at 13 on the opposite side of the waterway so that when the valves trip, the water valve and air valve swing in opposite directions and take positions on opposite sides of the waterway, as shown by the dotted lines.

Figure 2:
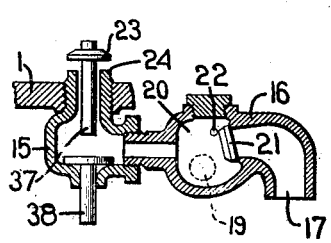
Fig. 2 is a detail in vertical cross section through the drip valve taken transversely of Fig. 1.

The casing 1 is provided with the usual neutral chamber 14 between the water valve and air valve. The connection to the accelerator is made to this chamber and this chamber is also provided with a drain port provided with a suitable drip valve. In the construction illustrated, these features are combined. A fitting 15 is threaded into the casing 1 at the bottom of the chamber 14. A second fitting 16 is threaded into one side of the fitting 15 and is provided with a drip opening 17 extending over a suitable drainage pipe 18. The connection to the accelerator is shown as made at 19 to the central chamber 20 of the fitting 16. A check valve 21 pivoted at 22, shown closed in Fig. 2 but normally standing open, cooperates with the valve seat between the chamber 20 and the drip opening 17. The drip valve 23 cooperating with the seat 24 at the top of the fitting 15 is connected to an arm 25 pivotally mounted on the pivot 13 and having an upstanding finger 26 adapted to engage a lug 27 extending from the arm 12. These parts, as in the aforesaid patent, are so arranged that when the water valve is closed, the drip valve 23 will be held open, as shown in the drawings.

In the construction illustrated, as in the aforesaid patent, the air valve 5 is provided with an extension 28 resting directly upon the stem 29 of the water valve which fits loosely in the arm 12.

The arm 12 is provided with a latch which acts as in the aforesaid patent to lock the water valve in its extreme position, shown in dotted lines, when it reaches that position, and which, in accordance with this invention, is also constructed to lock the water valve from closing after it has once opened to a predetermined extent. In the construction illustrated, this latch is carried by a rock shaft 30 journalled in the arm 12 and comprises three members, namely,—the head 31, the weighted portion 32 and the depending leg 33. The head 31 cooperates with the abutment 34, as in the aforesaid patent, to pass therebeneath when the water valve swings to extreme open position and to lock the water valve against closing. If the water valve opens slightly, the leg 33 swings by gravity on top of a shoulder 35 adjacent the water valve seat 6. The stop 36 on the arm 12 acts to prevent any unnecessary swinging movement of the latch when the water valve is swung to open position and acts as a stop both to hold the latch in locking position when beneath the abutment 34 and to hold the latch when the leg 33 is in position to seat on the shoulder 35. The latch is held in its normal position by the engagement of the leg 33 with the wall of the inlet.

The fitting 15 is shown as provided beneath the stem 37 of the drip valve 23 with a tickler device 38 by means of which an inspector can raise and lower the drip valve to ascertain if it is functioning properly.

With this general description of the construction illustrated, the operation of the apparatus will now be clear. Under normal conditions the parts will stand in the position shown in the drawings except that the check valve 21 will stand swung to its open position. Any water leaking past the water valve will drip out as usual past the open drip valve 23 through the fittings 15 and 16 past the open check valve 21 into the draining system 18.

If a sprinkler head opens, the accelerator acts at once, in the usual manner, to discharge air through the passage 19. This at once blows the check valve 21 into the closed position shown in Fig. 2 and fills the neutral chamber 14 with air at substantially the same pressure of the air on the upper side of the air valve. Under normal conditions, therefore, as when the air pressure in the dry pipe valve is less than the pressure of the water, the pressure on the two sides of the air valve being balanced, the water valve will at once be thrown to wide open position.

But if, as occasionally happens, the air pressure in the sprinkler system above the air valve is greater than the pressure of the water, the water valve will not open. But as the air pressure drops to slightly below the water pressure, the water valve will open slightly, allowing a body of water to pass into the neutral chamber, and as this neutral chamber is now closed by the check valve 21, a column of water will build up on top of the water valve and finally on top of the air valve, and this may so take place as to lock the water valve closed before the air pressure in the sprinkler system has gradually been sufficiently reduced below the pressure of the water to cause the air and water valves to be thrown to wide open position. But with the means provided by this invention, such rendering inoperative of the dry pipe valve is prevented because the length of the leg 33 of the latch is so proportioned with respect to the shoulder 35 of the valve seat that if the water valve once opens to a slight predetermined extent sufficient to start the filling of the neutral chamber 14 with water, the leg 33 will swing by gravity on top of the shoulder 35 and thus lock the water valve open. Hence any building up of a column of water on the water valve is prevented and as the air pressure in the sprinkler system is reduced, the water and air valves are thrown by the pressure of the water to wide open position.

Having thus described the invention, what is claimed as new, and desired to be secured by Letters Patent, is:

1. In a dry pipe valve, a casing having a waterway, a water valve adapted to close said waterway, a pivoted arm by which the water valve is carried, an air valve adapted to close said waterway above the water valve, means for carrying the air valve and for positioning it when seated so that it will hold the water valve seated, a shoulder on the casing adjacent the water valve seat, and a latch pivoted on the water valve carrying arm acting automatically to swing into engagement with said shoulder when the water valve opens slightly and thus prevent the water valve from thereafter closing.

2. In a dry pipe valve, a casing having a waterway, a water valve adapted to close said waterway, a pivoted arm by which the water valve is carried, an air valve adapted to close said waterway above the water valve, means for carrying the air valve and for positioning it when seated so that it will hold the water valve seated, a shoulder on the casing adjacent the water valve seat, an abutment on the casing, and a latch pivoted on the water valve carrying arm and having a head cooperating with the abutment to lock the water valve in wide open position and having a leg swinging into engagement with said shoulder when the water valve opens slightly thus to prevent the water valve from thereafter closing.

In testimony whereof I have signed my name to this specification.

WILLIS K. HODGMAN, Jr.